US012583056B2

(12) United States Patent
    Walde et al.

(10) Patent No.: US 12,583,056 B2
(45) Date of Patent: Mar. 24, 2026

(54) METHOD FOR MONITORING A LASER MACHINING PROCESS AND LASER MACHINING SYSTEM THEREFOR

(71) Applicant: Precitec Gmbh & Co. KG, Gaggenau (DE)

(72) Inventors: Tom Walde, Offenburg (DE); Rüdiger Moser, Malsch (DE); Igor Shkarban, Rheinstetten (DE); Dejan Miletic, Mannheim (DE)

(73) Assignee: Precitec GmbH & Co. KG, Gaggenau (DE)

( * ) Notice: Subject to any disclaimer, the term of this patent is extended or adjusted under 35 U.S.C. 154(b) by 991 days.

(21) Appl. No.: 17/715,386

(22) Filed: Apr. 7, 2022

(65) Prior Publication Data

US 2022/0324054 A1      Oct. 13, 2022

(30) Foreign Application Priority Data

Apr. 7, 2021    (DE) .......................... 102021108662.0

(51) Int. Cl.
    B23K 26/03        (2006.01)
    B23K 26/06        (2014.01)
                (Continued)
(52) U.S. Cl.
    CPC ........ B23K 26/032 (2013.01); B23K 26/0643 (2013.01); B23K 26/0648 (2013.01);
                (Continued)
(58) Field of Classification Search
    CPC .. G01B 9/0209; G01B 9/02091; G01B 11/22; G01B 5/0037; B23K 26/032;
                (Continued)

(56) References Cited

U.S. PATENT DOCUMENTS

2016/0039045 A1    2/2016   Webster
2019/0299331 A1    10/2019  Moser
                (Continued)

FOREIGN PATENT DOCUMENTS

CN      105829828 A    8/2016
CN      108620752 A    10/2018
                (Continued)

OTHER PUBLICATIONS

CN Search Report pertaining to CN application No. 202210362093.7 filed Apr. 7, 2022, pp. 1-2.
                (Continued)

*Primary Examiner* — Michael A Lyons
(74) *Attorney, Agent, or Firm* — DINSMORE & SHOHL LLP

(57) ABSTRACT

A method for determining a depth of a vapor capillary during laser machining includes: irradiating a machining laser beam onto a workpiece to form the capillary, the beam deflected by a first deflection device along a machining path within a first scan field, irradiating an optical measuring beam onto the workpiece, the measuring beam deflected by a second deflection device relative to the machining laser beam along a scanning path within a scanning area and then together with the machining laser beam by the first deflecting device, acquiring measured distance values along the path based on part of the measuring beam reflected by the workpiece, determining a depth/position of the capillary based on the acquired measured distance values. The scanning area size is based on a position of the laser beam and/or deflection of the laser beam by the first deflection device. A corresponding laser machining system is also provided.

19 Claims, 9 Drawing Sheets

(51) Int. Cl.

| | |
|---|---|
| *B23K 26/064* | (2014.01) |
| *B23K 26/08* | (2014.01) |
| *B23K 26/082* | (2014.01) |
| *B23K 26/24* | (2014.01) |
| *G01B 5/00* | (2006.01) |
| *G01B 9/02091* | (2022.01) |
| *G01B 11/22* | (2006.01) |

(52) U.S. Cl.
CPC ........ *B23K 26/082* (2015.10); *B23K 26/0876* (2013.01); *B23K 26/24* (2013.01); *G01B 5/0037* (2013.01); *G01B 11/22* (2013.01); *G01B 9/02091* (2013.01)

(58) Field of Classification Search
CPC .............. B23K 26/082; B23K 26/0643; B23K 26/0648; B23K 26/0876
See application file for complete search history.

(56) References Cited

U.S. PATENT DOCUMENTS

| | | | |
|---|---|---|---|
| 2020/0023461 A1 | 1/2020 | Galbraith et al. | |
| 2020/0171599 A1* | 6/2020 | Lessmueller | .......... B23K 26/26 |
| 2020/0238436 A1* | 7/2020 | Hermani | ............ B23K 26/0626 |
| 2020/0361038 A1* | 11/2020 | Takechi | ................. G01B 11/22 |
| 2022/0055147 A1* | 2/2022 | Yokoyama | ......... G01B 9/02075 |

FOREIGN PATENT DOCUMENTS

| | | | |
|---|---|---|---|
| CN | 110954018 A | 4/2020 | |
| DE | 102007027377 A1 | 1/2008 | |
| DE | 102016014564 A1 | 6/2018 | |
| DE | 102017117413 A1 | 2/2019 | |
| DE | 102017010055 A1 | 5/2019 | |
| DE | 102019210618 A1 | 1/2020 | |
| DE | 102020206089 A1 | 11/2020 | |
| EP | 3753666 A1 | 12/2020 | |
| EP | 3753667 A1 | 12/2020 | |
| KR | 102140049 B1 * | 8/2020 | ........... B23K 26/707 |

OTHER PUBLICATIONS

CN Third Office Action dated Nov. 27, 2025 pertaining to CN patent application No. 202210362093.7 filed Apr. 7, 2022, pp. 1-18 (Including English Translation).

* cited by examiner

S1

S2

S3

METHOD FOR MONITORING A LASER MACHINING PROCESS AND LASER MACHINING SYSTEM THEREFOR

CROSS-REFERENCE TO RELATED APPLICATION

This application claims priority to German application number 10 2021 108 662.0 filed Apr. 7, 2021, the disclosure of which is hereby incorporated by reference in its entirety.

FIELD OF THE INVENTION

The present invention relates to a method for monitoring a laser machining process, in particular a laser welding process, and a laser machining system, in particular a laser welding system, for monitoring a laser machining process.

BACKGROUND OF THE INVENTION

In a laser machining system, also referred to as a laser machining equipment or equipment for short, the machining laser beam emerging from a laser beam source or one end of a laser optical fiber is focused, for machining a workpiece, onto a workpiece to be machined. Machining may include laser beam welding. The laser machining system may include a laser machining head, for example a laser welding head, in which the beam guiding optics are integrated. For machining, the laser beam is irradiated onto a surface of the workpiece, the laser beam being moved over the surface along a so-called machining path. A vapor capillary, also referred to as a keyhole, forms in a region between the surface of the workpiece, onto which the laser beam is irradiated, down to a certain depth within the workpiece. Due to the irradiated laser power, the material of the workpiece in the region of the vapor capillary heats up so much that it vaporizes. The vapor capillary is surrounded by a region where the material is in a molten state. This region is called the melt pool.

The depth of the vapor capillary, i.e. the distance between the (unmachined) surface of the workpiece and the deepest point of the vapor capillary, is of great interest. The depth of the vapor capillary is related, for example, to a welding depth, i.e. the depth to which the material of the workpiece was melted during machining. On the one hand, knowing the depth of the vapor capillary or the welding depth allows conclusions about the strength of a welded joint, i.e. whether it was welded sufficiently deeply. On the other hand, knowing the depth of the vapor capillary may be used to ensure that the weld seam is not visible on the underside, i.e., that there is no undesired welding penetration. The depth of the vapor capillary, also referred to as the keyhole depth, is therefore a decisive factor for the quality of the resulting weld in laser beam welding. The deepest point of the vapor capillary is also known as the keyhole bottom or machining bottom.

For this reason, measuring the depth of the vapor capillary during laser beam welding is of great interest. Recently, depth and distance measurements have been carried out without contact using optical coherence tomography (OCT for short). For this purpose, an optical measuring beam, also known as OCT measuring beam, from an optical coherence tomograph is irradiated onto the workpiece and part of the optical measuring beam is reflected back from the workpiece into the optical coherence tomograph. In order to be able to reliably measure the depth of the vapor capillary, however, it must be ensured that the optical measuring beam hits the vapor capillary at the deepest point and that the light reflected from there in turn reaches the optical coherence tomograph.

SUMMARY OF THE INVENTION

In general, the position of the deepest point of the vapor capillary is not identical to the position of the machining laser beam. The position, shape and size of the vapor capillary on the workpiece surface depend on the current parameters of the laser machining process. These include, for example, the machining speed, also known as the feed rate, the machining direction, the power of the machining laser beam, the focus size of the machining laser beam, the material of the workpiece, etc. For example, an increase in the machining speed results in an increase in a distance between the position of the vapor capillary and the position of the machining laser beam.

For this reason, one of the greatest challenges is to position the OCT measuring beam on the workpiece in such a way that the deepest point of the vapor capillary can be reliably determined. When so-called scanner systems, in which the machining laser beam travels along the machining path by means of a scanning mirror or other deflection units, are used as the laser machining system for laser beam welding, this problem increases even further. This is because chromatic aberration and variable angles of the machining laser beam and the OCT measuring beam with respect to the lens and the workpiece cause the OCT measuring beam to be in a position on the workpiece which is different from that the machining laser beam. Furthermore, scanner systems, in particular scanner-based welding systems, often work at high machining speeds, which is why the offset between the position of the vapor capillary and the position or focus of the machining laser is typically significantly larger than in fixed optics systems. This problem is exacerbated by frequently changing welding directions and speeds.

There are also other effects which may adversely affect the measurements such as the polarization dependency of the reflection of mirrors of the scanner systems, thermal influences, movements of external axes, on which the scanner systems or the workpiece are located, and the associated vibrations as well as fluctuating material properties of the joining partners.

Typical scanner systems with an optical coherence tomograph for measuring the keyhole depth try to hit the keyhole "accidentally" by scanning around the position of the machining laser beam on the workpiece with the OCT measuring beam. This scanning is typically done in a rigid pattern (e.g. circle, horizontal figure 8, spiral). This means that for most measurements (typical measurement frequencies are in the range of 10 kHz to 500 kHz) the OCT measurement beam does not hit the keyhole and the few measurements from the keyhole have to be filtered out of the set of all measurements. Since the scan pattern is fixed, the size of the scan pattern, i.e. the scan area, must be adapted to the process situation in which the position of the keyhole is most uncertain. Thus, a large scanning area which must be scanned by the measuring beam in a short time is usually specified for the scan pattern. As a result, the ratio of measurements from the keyhole decreases as the size of the scan area increases. If welds are carried out in which only small keyhole diameters are formed, this ratio deteriorates further.

The reason for the decreasing quality of the measurements is that, on the one hand, the measurement frequency at which the optical coherence tomograph is able to work is limited and, on the other hand, the intensity of the OCT measurement beam is limited. Both result in fewer and fewer signals being generated from the deepest point of the keyhole with increasing size of the scan area for the OCT measuring beam and eventually, beyond a certain size of the scan area, not enough measurements being obtained from the keyhole to be able to make a sufficiently accurate statement regarding the keyhole depth.

It is an object of the present disclosure to specify a system and a method with which reliability, speed and accuracy of a determination of a depth and/or position of the vapor capillary during a laser machining process can be increased.

The object is solved by the subject matter disclosed herein. Advantageous refinements and developments are also disclosed.

The basic idea of the invention is based on determining or restricting, during a laser machining process, the area of the workpiece that has to be sampled or scanned by an optical measuring beam for an interferometric or optical distance measurement (e.g. for optical coherence tomography). This area, also referred to as the scanning area below, is determined by determining or adjusting the scanning area, for example a size, position and shape of the scanning area, based on at least one current (process) parameter of the laser machining process. In particular, the scanning area in which the optical measuring beam scans the workpiece surface can be adjusted based on a position of the laser machining beam within a first scanning field of a first deflection device for deflecting the laser machining beam along a predetermined machining path. This can reduce the probability of an incorrect measurement, i.e. a measurement outside the vapor capillary.

The scanning area may also be referred to as a search area or scan area and may specify an area on the workpiece or the workpiece surface within which the workpiece is scanned by the optical measuring beam to determine a position and depth of the vapor capillary. The scanning area may be stationary with respect to the laser machining beam. Thus, the scanning area may follow the machining beam that is deflected along the machining path. The scanning may be carried out by irradiating and deflecting the optical measuring beam along a scanning path within the scanning area and detecting distance measurement values along the scanning path based on a ratio reflected back from the workpiece. The position of the vapor capillary and/or the depth of the vapor capillary may then be determined based on the detected distance measurements. The position of the vapor capillary may be defined as the position of the deepest point of the vapor capillary and the depth of the vapor capillary may be defined as the distance between the (unmachined) surface of the workpiece and the deepest point of the vapor capillary.

The size of the scanning area may indicate the surface area of the scanning area on the workpiece. The shape of the scanning area may denote the geometry of the scanning area, i.e. the shape may be invariant under change of size. The position of the scanning area may be defined as a position of a center point or a geometric center of the area of the scanning area on the workpiece.

Instead of using the optical measuring beam to traverse or scan the region around the machining laser beam, also referred to as the machining field, with a fixed predetermined scanning figure, the scanning area in which the vapor capillary is sought is thus significantly reduced in the present disclosure. In addition, the focal position of the optical measuring beam can be adjusted, e.g. depending on its position on the workpiece or on its position within the first and/or second scan field. With otherwise unchanged parameters of the interferometric distance measurement, first, there is a higher signal intensity of the portion of the optical measuring beam reflected by the vapor capillary and thus a better signal-to-noise ratio. Secondly, significantly more distance measurement values are obtained "from the vapor capillary" since the optical measuring beam is moved over the vapor capillary more frequently. In particular for a laser welding process, there are more measured values from the vapor capillary per unit length of a produced weld seam.

According to a first aspect of the present disclosure, a method for monitoring a laser machining process or for determining a depth and/or position of a vapor capillary during a laser machining process is specified, the method comprising: irradiating a machining laser beam onto at least one workpiece to form the vapor capillary, the machining laser beam being deflected by a first deflection device along a machining path within a first scan field on the workpiece, irradiating an optical measuring beam onto the workpiece, the optical measuring beam being deflected by a second deflecting device relative to the machining laser beam along a scanning path within a scanning area on the workpiece and then being deflected by the first deflection device together with the machining laser beam, acquiring distance measurements along the scanning path based on a portion of the optical measuring beam reflected from the workpiece, in particular by means of optical coherence tomography, determining a depth and/or a position of a vapor capillary based on the acquired distance measurement values, wherein a size of the scanning area is determined or adjusted based on at least one parameter. In other words, the scanning area for the optical measuring beam can be adapted to the respective machining situation, i.e. based on the at least one parameter, so that it is minimal.

The size of the scanning area is determined or adjusted based on at least one of the following parameters: a position of the machining laser beam on the workpiece, a position of the machining laser beam within the first scan field, an angle or an orientation of the machining laser beam with respect to the workpiece, a deflection of the machining laser beam by the first deflection device, a machining direction, a machining speed, a machining velocity vector or a velocity vector of the machining beam, a power of the machining laser beam, a material and/or a thickness of the at least one workpiece, a deflection angle of the first deflection device, an optical path length of the machining laser beam between a laser source for the machining laser beam and the at least one workpiece, an optical path length of the optical measuring beam between a radiation source of the optical measuring beam and the at least one workpiece, a focal position of the machining laser beam, a focal position of the optical measuring beam, a cross-sectional shape of the machining laser beam, in particular a cross-sectional shape of the machining laser beam at the focal point, a cross-sectional shape of the optical measuring beam, in particular a cross-sectional shape of the optical measuring beam at the focal point, and an orientation of the laser machining system, in particular of the laser machining head and the workpiece with respect to each other.

According to a second aspect of the present disclosure, a laser machining system, in particular a laser welding system, is specified. The laser machining system comprises: a laser machining head for irradiating a machining laser beam onto at least one workpiece to form a vapor capillary, the laser machining head comprising a first deflection device for deflecting the machining laser beam along a machining path within a first scan field on the workpiece, a measuring device for interferometric distance measurement, in particular by means of optical coherence tomography, the measuring device being configured to irradiate an optical measuring beam onto the at least one workpiece, and a second deflection device for deflecting the optical measuring beam relative to the machining laser beam along a scanning path within a scanning area on the workpiece, a coupling device for coupling the optical measuring beam into the laser machining head, a coupling device for coupling the optical measuring beam into the laser machining head, the coupling device being arranged in front of the first deflection device in the direction of propagation of the machining laser beam so that the optical measuring beam can be deflected together with the machining laser beam by the first deflecting device, wherein the measuring device is configured to measure distance values along the scanning path based on a portion of the optical measurement beam reflected by the workpiece to determine a depth and/or a position of the vapor capillary.

The measuring device may be configured to determine or adjust the size of the scanning area based on at least one of the aforementioned parameters.

The laser machining system or a control unit contained therein may be configured to carry out the method for determining the depth of a vapor capillary according to embodiments.

The parameters may be current parameters during the laser welding process. The method may be performed during the laser machining process. In particular, the method may be carried out as an inline method. The scanning area may be determined or adjusted in real time. This allows for the position, size and shape of the scanning area to be determined at any time during the laser machining process and based on the current parameters.

The scanning area may be arranged in the wake of the laser machining beam. The scanning area is preferably defined relative to the (current) position of the laser machining beam and may thus be stationary. In other words, the scanning area may follow the movement of the laser machining beam. The laser machining head, through which the laser machining beam is irradiated onto the workpiece, and the workpiece are preferably arranged stationary with respect to one another, at least during the laser machining process, i.e. during the formation of a weld seam. Thus, during the laser machining process, the laser machining beam is preferably deflected along the machining path solely by the first deflection device. The machining path may correspond to a course of a desired weld seam. However, the present disclosure may also be applied to laser machining systems in which the workpiece is moved during machining by an axis system, for example. Another possibility is that the laser machining head is attached to a robot. In this case, the first deflection device deflects the laser machining beam, wherein the robot moves at the same time or synchronously. Clock time can be saved as a result. In this case, there is a higher-level controller that coordinates the movements of the robot and the first and/or second deflection unit. The movement of the laser machining beam is preferably carried out without superimposition of an oscillating movement or a so-called wobbling movement. If, however, an oscillating movement, preferably with a small amplitude, i.e. a so-called wobble movement, is superimposed on the movement of the laser machining beam along the machining path, the position of the scanning area may follow the movement of the laser machining beam along the machining path, preferably without taking the wobble movement into account.

The laser machining process may be a laser welding process or a laser beam welding process, in particular a laser beam scanner welding process. The laser machining system may be configured to carry out the laser machining process by irradiating the machining laser beam onto the workpiece.

The first deflection device and the second deflection device may also be referred to as a scanning device or scanner. The laser machining system may also be referred to as a scanner system.

One or more of the mentioned aspects may have one or more of the following optional features:

According to embodiments, a position and/or a shape of the scanning area may be determined based on the position of the machining laser beam, in particular the position of the machining laser beam within the first scan field. Alternatively or additionally, the position, the size and/or the shape of the scanning area may be determined based on a machining speed along the machining path and/or on a machining direction and/or on a machining velocity vector, i.e. on a velocity vector of the machining laser beam.

According to embodiments, a theoretical position of the vapor capillary may be determined and the position of the scanning area may be determined based on the determined theoretical position of the vapor capillary such that the determined theoretical position is included in the scanning area. In particular, the position of the scanning area may be determined based on the determined theoretical position of the vapor capillary in such a way that the determined theoretical position of the vapor capillary corresponds to the center point or geometric center of the scanning area. The theoretical position of the vapor capillary may be determined based on current process parameters. A large number of theoretical positions of the vapor capillary may be stored in a table for various process parameters, for example.

The scanning path may be determined in such a way that a beginning or a starting point of the scanning path corresponds to the theoretical position of the vapor capillary.

The method may be carried out continuously and/or repeatedly and/or iteratively during the laser machining process. For example, the center point or geometrical center of the scanning area may be determined in such a way that it corresponds to a position of the vapor capillary previously determined from the measured distance values.

A size of the determined or adjusted scanning area may be less than a size of the second scan field. The size of the scanning area may be set to be equal to or larger than five times the (theoretical) size of the vapor capillary. The size of the vapor capillary may essentially correspond to the area of the vapor capillary on the workpiece surface.

A size of the scanning area may be set the larger, the closer the position of the machining laser beam is to an edge of the first scan field and/or the higher the machining speed is. A size of the scanning area may be set the larger, the more the laser machining beam is deflected by the first deflection device, e.g. from a zero position. The zero position may denote an undeflected orientation of the laser machining beam, i.e. the laser machining beam is not deflected by the first deflection device. In the zero position, the laser machining beam preferably runs coaxially to an optical axis of the laser machining head or to an optical axis of a focusing lens system.

A distance between the position of the scanning area on the workpiece surface and the position of the machining laser beam on the workpiece surface may be set the greater, the greater a machining speed is.

The position, the shape and/or the size of the scanning area may be determined in such a way that the position of the machining laser beam is located outside the scanning area. The scanning area may be arranged along the machining path and/or in the machining direction in the wake of the position of the machining laser beam.

The shape of the scanning area may be adjusted and/or oriented based on a machining direction. For example, based on the machining direction, a circular shape or a teardrop shape may be set as the shape of the scanning area. In the case of shapes that are not point symmetrical, e.g. teardrop shape, trapezoidal shape, triangular shape, the shape may be oriented depending on the machining direction or the velocity vector of the machining beam.

The scanning path, or a part thereof, may be in the shape of a figure 8, a horizontal figure 8, a dumbbell, a peanut, a spiral, a circle, and/or an arc. The scanning path, or a part thereof, may have a zigzag, sawtooth, rectangular and/or meander shape.

The scanning area may be determined based on table values and/or using an artificial neural network. Alternatively or additionally, the scanning area may be adjusted based on a functional relationship between the parameters mentioned. The table values may be obtained on the basis of experiments and/or simulations. Alternatively or additionally, the scanning area may be determined or stored on the basis of theoretical and/or experimental and/or analytical values or a combination thereof. According to embodiments, non-existent table values may be interpolated or extrapolated. The artificial neural network may be trained based on experimental data.

The scanning area, in particular the position, shape and/or size of the scanning area, and/or the theoretical position of the vapor capillary may also be determined based on at least one further parameter of the laser machining system, for example based on an orientation of mirrors of the first and/or second deflection devices to one another, and/or based on parameters of a portal or a robot, in particular a robot arm, by means of which a relative position between the laser machining head and the workpiece can be changed.

The optical measuring beam can be coupled prior to the first deflection device in the beam propagation direction of the machining laser beam. The coupling device, for example a beam splitter or a dichroic mirror, may be arranged in front of the first deflection device in the beam propagation direction.

The first deflection device may be configured to deflect the machining laser beam by at least a first deflection angle along a first axis. The first deflection device is preferably additionally configured to deflect the machining laser beam by a second deflection angle along a second axis, the first and second axes being arranged at an angle to one another, for example being perpendicular to one another. The maximum first deflection angle and/or the maximum second deflection angle of the first deflection device may each be equal to or greater than 10 degrees, in particular 10 to 20 degrees. These deflection angles correspond to mirror angles of at least +/−5 degrees, in particular +/−10 degrees, since the beam is deflected by twice the mirror angle.

The second deflection device may be configured to deflect the measurement beam by at least a first deflection angle along a first axis. The second deflection device is preferably additionally configured to deflect the measuring beam by a second deflection angle along a second axis, the first and second axes being arranged at an angle to one another, for example being perpendicular to one another. A maximum first deflection angle and/or a maximum second deflection angle of the second deflection device may each be less than 10 degrees and may preferably be less than 3 degrees, in particular approximately 2 degrees.

The first scan field of the first deflection device may be defined as a region on the workpiece, in particular the workpiece surface, and/or may be given by a maximum first and a maximum second deflection angle of the first deflection device. The second scan field of the second deflection device may be defined as a region on the workpiece, in particular the workpiece surface, and/or may be given by a maximum first and a maximum second deflection angle of the second deflection device. A length and/or a width of the first scan field may be equal to or greater than 50 mm. The first scan field may, for example, have a size on the workpiece of more than 50×50 mm, in particular equal to or larger than approximately 100×200 mm or 250×150 mm. A length and/or a width of the second scan field on the workpiece may be less than 30 mm, preferably less than 15 mm, for example approximately 10 mm. According to embodiments, the first and/or the second scan field has an elliptical shape. In this case, the length of the scan field may indicate the length of the major axis of the ellipse and the width of the scan field may indicate the length of the minor axis of the ellipse.

The second deflection device may have a second scan field that is smaller than the first scan field. The first deflection device may be configured as a large field scanner and/or the second deflection device may be configured as a small field scanner.

In order to effect the deflection of the machining laser beam, the first deflection device may have a first movable mirror and a second movable mirror. The first movable mirror can be rotated about a first axis of rotation and the second movable mirror can be rotated about a second axis of rotation, the first axis of rotation and the second axis of rotation being at an angle, for example at an angle between 45° and 135°, in particular of approx 75° or 90°, with respect to each other. For this purpose, the mirror or the first and second mirrors may be configured as galvanometer mirrors, or galvo mirrors for short. Alternatively, the first deflection device may have a movable mirror that can be rotated or pivoted about at least two axes. Accordingly, the first deflection device may be configured as a galvanometer or galvo scanner. Alternatively, the first deflection device may be configured as a prism scanner or lens scanner.

In order to effect the deflection of the optical measurement beam, the second deflection device may include a first movable mirror and a second movable mirror. The first movable mirror can be rotated about a first axis of rotation and the second movable mirror can be rotated about a second axis of rotation, the first axis of rotation and the second axis of rotation being at an angle with respect to each other, for example at an angle between 45° and 135°, in particular of approx 75° or 90°. Alternatively, the second deflection device may include a movable mirror that can be rotated or pivoted about at least two axes. In order to move the mirror or the first and second mirrors, the second deflection device may comprise at least one corresponding galvanometer drive. Correspondingly, the mirror or the first and second mirrors may be configured as galvanometer mirrors, or galvo mirrors for short. Accordingly, the second deflection device may be configured as a galvanometer or galvo scanner. Alternatively, the second deflection device may be configured as a prism scanner or lens scanner.

Alternatively, the first deflection device and/or the second deflection device may include MEMS-based, piezoelectric and/or inductive drives.

Furthermore, the focal position of the optical measuring beam may be set, preferably independently of the focal position of the laser machining beam. The focal position of the optical measurement beam may be adjusted as a function of the position of the laser machining beam and/or the optical measurement beam in the first scan field. In particular, the optical measuring beam may be focused on the workpiece, in particular on a surface of the workpiece. Focusing the optical measuring beam on the workpiece or on the workpiece surface has the advantage that a higher signal intensity of the portion of the optical measuring beam reflected from the vapor capillary and thus a better signal-to-noise ratio can be obtained.

To set the focal position of the optical measurement beam, the laser machining system may include a collimation device for collimating the optical measurement beam. The collimating device may comprise collimating optics. The collimator optics may be shifted along an optical axis of the collimation device and/or along a beam propagation direction of the optical measurement beam. The shift may be by motor, for example. The measuring device may be configured to control the collimation device such that the focal position of the optical measuring beam is set based on the position of the optical measuring beam within the first scan field and/or based on the position of the optical measuring beam within the second scan field. As a result, the focus of the optical measurement beam can be adjusted as a function of the position of the machining laser beam and/or of the optical measurement beam in the first scan field and/or as a function of the optical measurement beam in the second scan field.

The collimation device for the optical measuring beam may be arranged in front of the coupling device in the beam propagation direction of the optical measuring beam.

The laser machining system may also include a collimation device for collimating the machining laser beam. The collimation device for the machining laser beam may be arranged in front of the coupling device in the beam propagation direction of the machining laser beam. The collimation device for the machining laser beam or a part thereof may be shifted along an optical axis of the collimation device and/or along a beam propagation direction of the machining laser beam in order to adjust a focal position of the machining laser beam. The collimation device may comprise two or more lenses, the distances between which can be changed, at least in part. The shift may be by motor, for example. A control unit of the laser machining system may be configured to control the collimation device in such a way that the focal position of the machining laser beam is set based on the position of the machining laser beam within the first scan field.

The laser machining system may also include a focusing device for focusing the machining laser beam and/or the optical measuring beam. The focusing device may include two or more lenses, the distances between which can be changed at least in part in order to set or change the focus position. In particular, the focusing device may be configured to focus the machining laser beam on the workpiece, in particular on a surface of the workpiece. The focusing device may be arranged after the first deflection device in the beam propagation direction of the machining laser beam.

Preferably, the optical measurement beam and/or the laser machining beam is focused by means of an F-theta lens. The F-theta lens is preferably configured for both the wavelength of the optical measuring beam and that of the laser machining beam. The F-theta lens may be arranged telecentrically.

The measuring device may be embodied as or may include an optical coherence tomograph. The measuring device configured as an optical coherence tomograph may have a dynamic reference arm for expanding the measuring range.

Furthermore, an offset for the deflection of the optical measurement beam by the second deflection device may be determined to compensate for a chromatic aberration of the optical measurement beam relative to the machining laser beam. Taking into account the determined offset, the optical measuring beam may be deflected along the scanning path. According to embodiments, the offset may be determined based on table values. The table values may be stored in a control unit of the laser machining system. Here, non-existent table values may be interpolated or extrapolated.

The laser machining system may also include a control unit configured to control the laser machining system and/or elements thereof in order to carry out the laser machining process or the method for monitoring the laser machining process or for determining a depth and/or position of the vapor capillary. In particular, the control unit may be configured to control the laser machining head, the first deflection device, the second deflection device, the collimation device for the optical measurement beam, and/or the collimation device for the machining laser beam. The functionality of the measuring device may be integrated in the control unit or the measuring device may be integrated in the control unit.

The laser machining system may further comprise a laser source for generating the machining laser beam or may be configured to couple the machining laser beam from a laser source for generating the machining laser beam into the machining head, e.g. via a fiber coupler. The laser source may also be referred to as a laser for short. The laser may be in the form of a single-mode laser, a multi-mode laser, a solid-state laser and/or a fiber laser. The laser machining system may include an optical fiber for guiding the laser beam from the laser source to the laser machining head. The laser machining system may include additional sensors, for example photodiodes, pyrometers and/or a camera. The additional sensors may be used to find among the distance measurements those which represent the depth of the vapor capillary. The laser machining system may also include an interface for transmitting data to an external system.

The at least one workpiece may comprise a battery cell. The machining laser beam may be irradiated for contacting the battery cell. Alternatively or additionally, the at least one workpiece may comprise a power electronics component. The machining laser beam may be irradiated for welding the power electronics component. Alternatively or additionally, the at least one workpiece may comprise a mobile phone component. The machining laser beam may be irradiated for welding the component for the mobile phone.

BRIEF DESCRIPTION OF THE DRAWINGS

The invention is described in detail below with reference to figures.

DETAILED DESCRIPTION OF THE INVENTION

Unless otherwise noted, the same reference symbols are used below for elements that are the same or have the same effect.

Figure 1A:
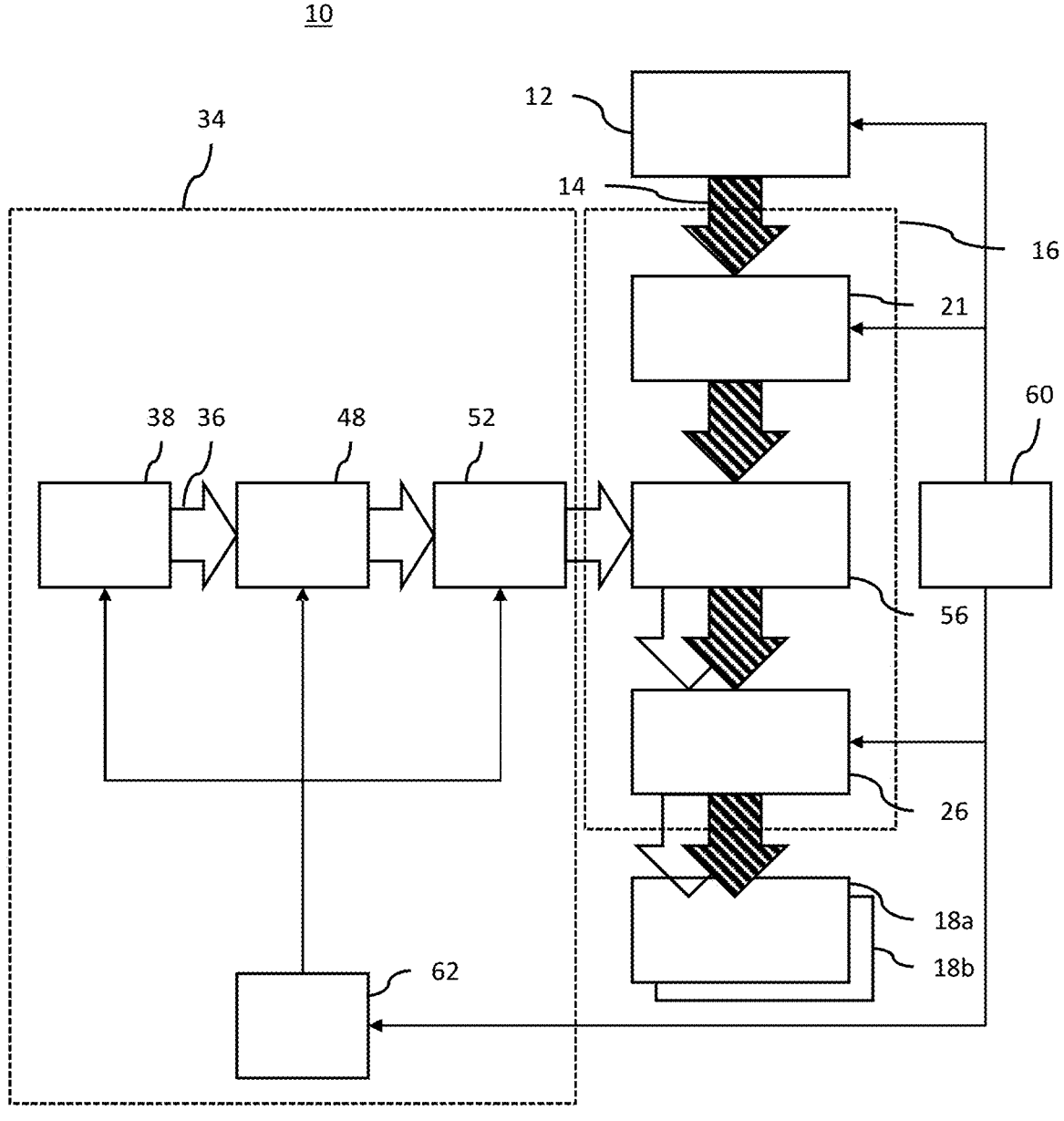
FIG. 1A is a block diagram of a laser machining system according to embodiments of the present disclosure.
Figure 1B:
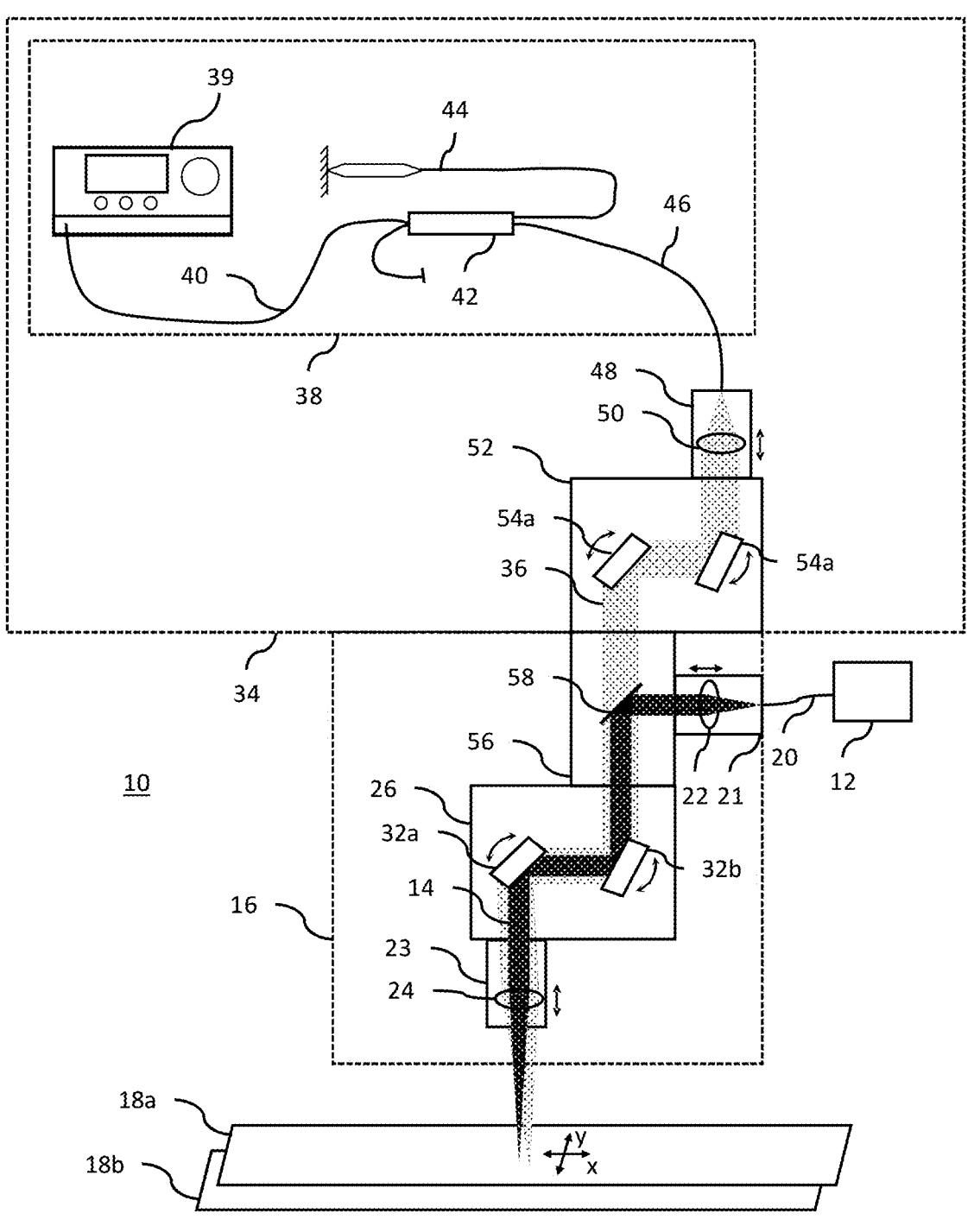
FIG. 1B is a schematic view of a laser machining system according to embodiments of the present disclosure.

FIG. 1A is a block diagram and FIG. 1B is a schematic view of a laser machining system according to embodiments of the present disclosure.

The laser machining system 10 may be coupled to a laser source 12 for generating a machining laser beam 14, also referred to as machining beam or laser beam for short, in order to couple the machining laser beam 14 into a laser machining head 16 of the laser machining system 10. The laser machining system 10 includes the laser machining head 16 for irradiating and directing the machining laser beam 14 onto at least one workpiece 18a, 18b. The laser source 12 may be embodied as a single-mode laser, a solid-state laser or a fiber laser.

The laser machining system 10 may be configured to carry out a laser welding process for welding the at least one workpiece 18a, 18b. In this case, the laser machining system 10 may be configured as a laser welding system and the laser machining head 16 may be configured as a laser welding head. For example, the laser machining system 10 may be configured to weld two workpieces 18a, 18b to one another. As shown in FIG. 1B, the two workpieces 18a, 18b are arranged in a lap joint, but the present disclosure is not limited thereto. The workpieces may also be arranged, for example, in a parallel joint or in a butt joint.

The at least one workpiece 18a, 18b is welded by irradiating the machining laser beam 14 onto the at least one workpiece 18a, 18b along a machining path to form a weld seam (see FIGS. 4A-4D). When the machining laser beam 14 is irradiated onto the at least one workpiece 18a, 18b, the material of the workpiece 18a, 18b heats up so much that it evaporates. This creates a vapor capillary (not shown) in a region from the surface of the workpiece 18a, 18b up to a certain depth in the workpiece 18a, 18b. The depth of the vapor capillary is extremely important for assessing the quality of the laser welding process, as it allows conclusions about the strength of the welded joint, among other things. The laser machining system 10 is configured to determine the depth and/or the position of the vapor capillary.

The machining laser beam 14 is transmitted from the laser source 12 to the laser machining head 16 via an optical fiber 20 of the laser machining system 10 and is coupled into the laser machining head 16 from one end of the optical fiber 20, e.g. by means of a fiber coupler. A collimation device 21 arranged subsequently to the fiber coupler includes collimator optics 22 for collimating the machining laser beam 14 emerging divergently from the end of the optical fiber 20. The focal position of the machining laser beam 14 may be set or corrected with the aid of the collimation device 21. The axis along which the focus position of the machining laser beam 14 can be adjusted may correspond to an optical axis of the laser machining head 16, in particular an optical axis of a focusing optics 24. The axis may also be referred to as the z-axis. Accordingly, the collimator optics 22 may be referred to as z-collimator optics or z-collimation for short. The focus position may be set by shifting the collimator optics 22 along the optical axis of the collimator optics 22 or a beam axis of the machining laser beam 14. The collimation device 21 may include a motor unit for shifting the collimator optics 22.

Furthermore, the laser machining head 16 includes a focusing device 23 including the focusing optics 24 for focusing the machining laser beam 14 onto the workpiece 18a, 18b. The focusing optics 24 may, for example, be in the form of F-theta optics or include F-theta optics.

In order to change the position of the machining laser beam 14 on the workpiece 18a, 18b, and in particular to irradiate the machining laser beam 14 along the machining path, the laser machining system 10 further includes a first deflection device 26 for deflecting or displacing the machining laser beam 14 relative to the workpiece 18a, 18b. The first deflection device 26 is configured to move and deflect the machining laser beam 14 with respect to the workpiece 18a, 18b along two axes x, y (see FIG. 2). According to embodiments, the two axes x, y may be perpendicular to one another and parallel to a surface of the workpiece 18a, 18b, but are not restricted thereto. The first deflection device 26 may also be referred to as a scanner. The machining path may be travelled by the machining laser beam 14 using the first deflection device 26.

The first deflection device 26 is configured to deflect the machining laser beam 14 along the x-axis by a first deflection angle and to deflect the machining laser beam 14 along the y-axis by a second deflection angle. The deflection device 26 has a zero position with respect to the x-axis and with respect to the y-axis, in which the machining laser beam 14 assumes a zero position along the respective axis (see FIG. 2). The zero position of the x-axis and the zero position of the y-axis together may be viewed as the midpoint or center 30 of a first scan field 64 of the first deflection device 26. The center 30 of the first scan field 64 may correspond to a non-deflected position of the machining laser beam 14, i.e. a (general) zero position of the machining laser beam 14. In the undeflected position of the machining laser beam 14, the machining laser beam 14 may extend between the laser machining head 16 and the workpiece 14 coaxially to an optical axis of the laser machining head 16 and/or an optical axis of the focusing optics 24.

A maximum first deflection angle 28 along the x-axis (i.e. rotation about y-axis) and a maximum second deflection angle 29 along the y-axis (i.e. rotation about x-axis) determine a border of the first scan field 64 on the surface of the workpiece 18a, 18b within which the first deflection device 26 can deflect the machining laser beam 14 with respect to the workpiece 18a, 18b. According to embodiments, the first deflection device 26 is configured as a large field scanner. For example, the maximum first deflection angle 28 and/or the maximum second deflection angle 29 may be greater than 10 degrees. The first and second maximum deflection angles may be predetermined by design. Alternatively, the F-theta lens used as a focusing device may limit the maximum deflection angle.

Figure 2:
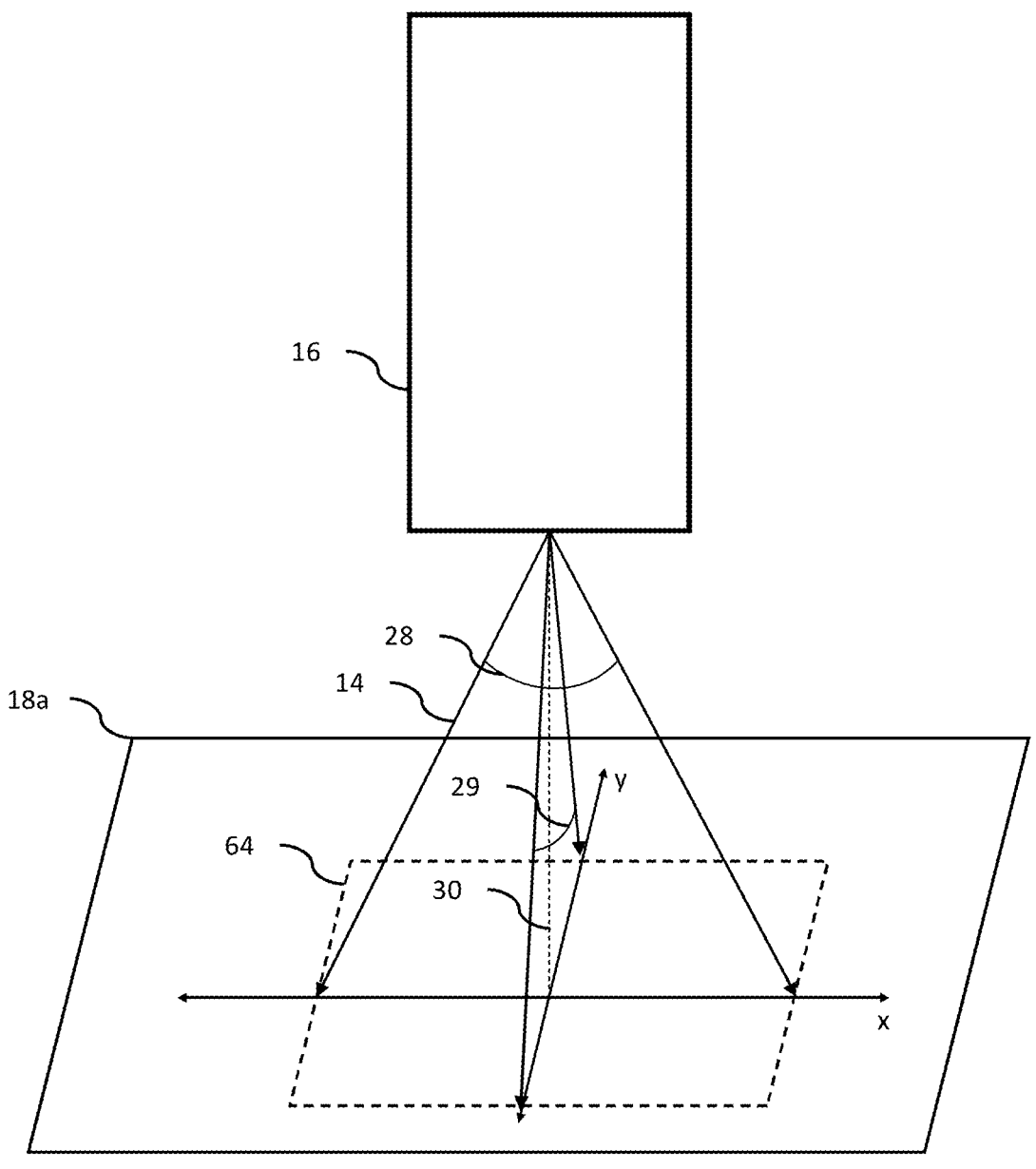
FIG. 2 shows a schematic view for illustrating a first scan field of a first deflection device for a laser machining system according to embodiments of the present invention.

In FIG. 2, the first scan field 64 is shown as having a rectangular shape, but the present disclosure is not restricted thereto. The first scan field 64 may also have a circular or an elliptical shape. In this case, the rectangle shown in FIG. 2 may be regarded as the rectangle with the largest area that can be inscribed in the elliptical first scan field 64.

According to embodiments, the first deflection device 26 comprises two movable mirrors 32a, 32b rotatable about different axes of rotation. The mirrors 32a, 32b may be configured as galvanometer mirrors. In this case, the first deflection device 26 may be referred to as a galvanometer scanner or galvo scanner.

According to embodiments, the laser machining head 16 and/or the workpiece 18*a*, 18*b* can also be moved relative to one another, preferably between two consecutive laser machining processes. For example, the workpiece 18*a*, 18*b* may be moved relative to the laser machining head 16 by a first moving unit (not shown). Alternatively or additionally, the laser machining head 16 may be moved relative to the workpiece 18*a*, 18*b* by a second movement unit (not shown). The second movement unit may be configured as a robot, for example, and the laser machining head 16 may be attached to the robot. During a laser machining process, i.e. during the formation of a weld seam, the laser machining head 16 or the laser machining system 10 preferably remains stationary with respect to the workpiece 18*a*, 18*b* (zero relative speed).

The laser machining system 10 further comprises a measuring device 34 for interferometric distance measurement or optical distance measurement using an optical measuring beam 36. The measuring device 34 is configured, for example, to measure a distance between the laser machining head 16 and the workpiece 18*a*, 18*b*.

According to embodiments, the measuring device 34 comprises an optical coherence tomograph or may be embodied as an optical coherence tomograph. In other words, the distance measurement may be based on optical coherence tomography (OCT). The measuring device 34 includes an evaluation unit 38 with a broadband light source, for example a superluminescent diode (SLD). The light source 39 couples measuring light into an optical fiber 40. The measuring light is split into a reference arm 44 and a measuring arm 46 in a beam splitter 42 preferably configured as a fiber coupler. The measuring light of the measuring arm 46 is transmitted as the optical measuring beam 36 via an optical fiber to a collimation device 48 and is coupled into the collimation device 48 from the end of the optical fiber in order to be irradiated onto the workpiece 18*a*, 18*b*.

The collimation device 48 includes collimator optics 50 for collimating the optical measurement beam 36 emerging divergently from the end of the optical fiber. The focal position of the optical measurement beam 36 may be set with the aid of the collimator optics 50. The axis along which the focal position of the optical measuring beam 36 can be adjusted may correspond to an optical axis of the laser machining head 16, in particular an optical axis of the focusing optics 24. The axis may also be referred to as the z-axis. Accordingly, the collimator optics 50 may be referred to as z-collimator optics 50 or z-collimation for short. The focal position may be set by displacing the collimator optics 50 along the optical axis of the collimator optics 50 or a beam propagation direction of the optical measuring beam 36. The displacement can be by motor.

According to embodiments, the reference arm 44 may be configured as a dynamic reference arm. The measuring range of the measuring device 34 can thus be expanded.

The principle of distance measurement described herein is based on the principle of optical coherence tomography, which uses the coherence properties of light with the aid of an interferometer. To measure the distance, the optical measuring beam 36 is irradiated onto a surface of the workpiece 18*a*, 18*b*. The part of the optical measuring beam 36 reflected back from the surface is imaged onto the end of the optical fiber of the measuring arm 46, superimposed on the part of the measuring light reflected back from the reference arm 44 in the beam splitter 42 and brought to interference. The superimposed light contains information about the path length difference between the reference arm 44 and the measuring arm 46. This information is evaluated by the evaluation unit 38. As a result, information about the distance to the workpiece 18*a*, 18*b* or between the workpiece 18*a*, 18*b* and the laser machining head 16 may be obtained.

To determine the depth of the vapor capillary, the optical measuring beam 36 has to be directed into the vapor capillary and reflected back from the bottom of the vapor capillary to the measuring device 34 or evaluation unit 38. When a distance to the surface of the workpiece 18*a*, 18*b* is also known, the measuring device 34 or the evaluation unit 38 may determine a depth of the vapor capillary, i.e. the distance from the deepest point of the vapor capillary to the surface of the workpiece 18*a*, 18*b*. However, since the exact position of the deepest point of the vapor capillary is unknown, the measuring beam 36 is moved along the scanning path within the scanning area in order to scan or sample the workpiece surface within the scanning area.

In order to change the position of the measuring beam 36 on the workpiece 18*a*, 18*b* in order to measure the distance from the workpiece 18*a*, 18*b* at different positions, the measuring device 34 comprises a second deflection device 52 for deflecting or displacing the optical measuring beam 36 relative to the workpiece 18*a*, 18*b*. Measuring the distance from the workpiece 18*a*, 18*b* at different positions may also be referred to as scanning the workpiece. The second deflection device 52 is configured to move and deflect the optical measuring beam 36 with respect to the workpiece 18*a*, 18*b* along two axes. The two axes may correspond to the x- and y-axes of the first deflector 26, but the present disclosure is not restricted thereto. The second deflection device 52 may also be referred to as a scanner. Using the second deflection device 52, the surface of the workpiece 18*a*, 18*b* and the vapor capillary may be scanned.

The second deflection device 52 has a maximum first deflection angle and a maximum second deflection angle. Based on the maximum first deflection angle and the maximum second deflection angle of the second deflection device 52, the second deflection device 52 has a second scan field 66 (see FIGS. 4A-4D) within which the second deflection device 52 can deflect the optical measuring beam 36 with respect to the workpiece 18*a*, 18*b*. According to embodiments, the second deflection device 52 is configured as a small field scanner. For example, the maximum first deflection angle and/or the maximum second deflection angle of the second deflection device 52 may be less than 10 degrees. Thus, an area or size of the second scan field 66 may be less than that of the first scan field 64. The second scan field 66 may have a rectangular, circular or elliptical shape. The first and second maximum deflection angles may be predetermined by design.

According to embodiments, the second deflection device 52 comprises two movable mirrors 54*a*, 54*b* rotatable about different axes of rotation. The mirrors 54*a*, 54*b* may be configured as galvanometer mirrors. In this case, the second deflection device 52 may be referred to as a galvanometer scanner or galvo scanner.

The laser machining head 16 further comprises a coupling device 56 for coupling the optical measuring beam 36 into the laser machining head 16. The coupling device 56 is configured to superimpose the optical measuring beam 36 on the machining laser beam 14. The coupling device 56 comprises, for example, a beam splitter 58. According to embodiments, the beam splitter 58 may be configured as or comprise a dichroic mirror. The beam splitter 58 may transmit light of the optical measuring beam 36 and reflect light of the machining laser beam 14. According to embodiments, the (undeflected) optical measurement beam 36 and the (undeflected) machining laser beam 14 may extend in parallel and/or coaxially to one another, at least in segments.

The optical measuring beam 36 is coupled into the laser machining head 16 by the coupling device 56 before the first deflection device 26 in the beam propagation direction of the optical measuring beam 36 or the machining laser beam 14. In particular, the optical measuring beam 36 and the machining laser beam 14 pass both though the first deflection device 26 and the focusing device 23. Accordingly, the optical measurement beam 36 is deflected by the first deflection device 26 together with the machining laser beam 14. Neglecting the chromatic aberration, a center of the second scanning area 66 of the second deflection device 52 may correspond to a position of the machining laser beam 14 on the workpiece 18a, 18b. The optical measuring beam 36 is then focused by the focusing optics 24 of the focusing device 23 together with the machining laser beam 14.

Since only the measuring beam 36 passes the second deflection device 52, the optical measuring beam 36 is deflected by the second deflection device 52 relative to the machining laser beam 14 and independently of a deflection of the machining laser beam 14 by the first deflection device 26.

The laser machining system 10 further comprises a central control unit 60. The central control unit 60 is configured to control the laser machining system 10 or elements to perform the laser machining process and the method for determining the depth and/or the position of the vapor capillary according to embodiments of the present disclosure. For example, the central control unit 60 is configured to control the laser source 12, to turn the machining laser beam 14 on and off (laser control on/off) or to set or modulate the power of the machining laser beam 14 (power modulation). Furthermore, the central control unit 60 may be configured to control the focusing device 23 to set or correct the focal position of the machining laser beam 14. Furthermore, the central control unit 60 may be configured to control the first deflection device 26 to deflect the machining laser beam 14 on the workpiece 18a, 18b, and in particular to travel the machining path with the machining laser beam 14. Furthermore, the central control unit 60 is configured to transmit information about the position of the machining laser beam 14 in the first scan field and the current power of the machining laser beam 14 to a control unit 62 of the measuring device 34.

The control unit 62 is configured to control the evaluation unit 38, the collimation device 48 and the second deflection device 52. For example, the control unit 62 is configured to output a signal for controlling the dynamic reference arm 44 to the evaluation unit 38. Furthermore, the control unit 62 is configured to control the collimation device 48 to set or correct a focal position of the optical measuring beam 36 and in particular to set a focal position of the optical measuring beam 36 in the z-direction. In addition, the control unit 62 may be configured to output a control signal for setting the position of the optical measuring beam 36 to the second deflection device 52.

The control unit 62 may be further configured to determine a correction of the chromatic aberration for the optical measurement beam 36, in particular as a function of the position of the machining laser beam 14. The correction may be determined along the x-, y-, and/or z-axis. The control unit 62 may be further configured to determine a correction for the optical measurement beam 36 for the probable deviation of the position of the vapor capillary relative to the machining laser beam 14 along the x- and y-axes. Finally, the control unit 62 may be configured to determine a scanning area for the optical measuring beam 36 and a scanning strategy, as is described in detail below. In particular, the scanning area may be determined in a vicinity of the theoretical position of the vapor capillary.

One or more of the mentioned functionalities of the control unit 62 may be implemented by the central control unit 60 and/or the control unit 62 may be integrated into the central control unit 60.

Since, as mentioned above, the exact position (the deepest point) of the vapor capillary is unknown, the workpiece surface is scanned with the measuring beam 36 within the scanning area 76. According to the invention, the frequency of incorrect measurements or measurements at a position not corresponding to the vapor capillary (the deepest point) can be reduced by adjusting the scanning area 76 based on at least one parameter or by determining the scanning area 76 with the smallest possible size. The measuring device 34 and the control unit 62 are therefore configured to determine a scanning area 76 (see FIGS. 4A-4D) for the optical measuring beam 36. The scanning area 76 for the optical measuring beam 36 indicates an area on the surface of the workpiece 18a, 18b within which the optical measuring beam 36 is directed and deflected onto different positions of the workpiece 18a, 18b. A distance to the workpiece 18a, 18b may be sensed or measured at the various positions based on the above-described part of the optical measuring beam 36 reflected from the surface of the workpiece 18a, 18b in order to obtain corresponding measured distance values. The optical measuring beam 36 may be irradiated onto the different positions within the scanning area 76 along a scanning path 82 (see FIG. 5). The scanning path 82 may have a spiral or zigzag shape, for example. Determining the scanning path 82 within the scanning area 76 may also be referred to as determining the scanning strategy.

Based on the acquired distance measurements along the scanning path 82 within the scanning area 76, the position 78 of the vapor capillary (see FIGS. 4A-4D, 5) and the depth of the vapor capillary can then be determined. The scanning area may also be referred to as the search area for the position 78 of the vapor capillary since the position 78 of the vapor capillary is determined based on the distance measurements taken within the scanning area 76. For example, the position where the largest measured distance value is determined is established to be the position 78 of the vapor capillary.

Adapting the scanning area to the current process situation is also necessary because the (actual) position 78 of the vapor capillary does not necessarily match the position of the machining laser beam 14 on the workpiece 18a, 18b or has a constant offset thereto. It depends on various parameters of the laser machining process. Accordingly, there may be a possibly variable distance or offset between the position 78 of the vapor capillary and the position 68 of the machining laser beam 14. This is illustrated in FIGS. 4A-4D where the position 78 of the vapor capillary along the machining path 70 is located in the wake of the position 68 of the machining laser beam 14 on the workpiece 18a, 18b. In particular, the offset depends on parameters of the laser machining process, also referred to as process parameters. These include the position 68 of the machining laser beam 14 on the workpiece 18a, 18b and/or in relation to the first scan field, the angle of the machining laser beam 14 with respect to the workpiece 18a, 18b, the deflection angle or the current deflection of the machining laser beam 14 by the first deflection device, a machining speed along the machining path 70, a machining vector or a velocity vector of the machining beam, a power of the machining laser beam 14, a material and a thickness of the workpiece 18*a*, 18*b*.

The influence of these parameters on the offset between the position of the machining laser beam and the position of the vapor capillary, in particular the deepest point of the vapor capillary, may depend on the configuration of the laser machining system, e.g. the focal length, the optics used, etc., and may have to be determined individually for each system. This may be carried out, for example, by simulation, experiments and measurements. To determine a (theoretical) position of the vapor capillary during a specific or specified laser machining process, information about the influence of the process parameters on the position of the vapor capillary may be stored in the control unit of the laser machining system as table values or as a functional relationship for subsequent, similar or identical laser machining processes. Alternatively or additionally, the determination may also be made using an artificial neural network that has been trained with the information.

The actual position of the vapor capillary during the laser machining process is therefore not readily known. At the same time, the measuring frequency of the measuring device is limited. This means that only a limited number of measured distance values can be obtained per unit of time. When the workpiece surface is scanned by the optical measuring beam within the entire second scanning area of the second deflection device, relatively few measured distance values are obtained from the deepest point of the vapor capillary. As a result, a sufficiently precise statement about the depth of the vapor capillary cannot be made.

The present disclosure is based on the basic idea of adapting or optimizing the scanning area for scanning the workpiece by means of the optical measuring beam during the laser machining process based on the current process parameters during the laser machining process. This makes it possible to determine the scanning area as a function of the current and variable position of the machining laser beam during the laser machining process.

So instead of scanning the workpiece with the optical measuring beam in a fixed predetermined scanning area or within the entire second scan field of the second deflection device in order to scan the position of the machining laser beam, as in the prior art, the scanning area in which the workpiece is scanned and the vapor capillary is searched for is significantly restricted in the present disclosure. This increases the probability that the optical measuring beam will hit the vapor capillary within the scanning area when scanning along the scanning path. Thus, more measured distance values are obtained from the vapor capillary. In particular, this results in more measured distance values from the vapor capillary per unit of time or per unit of length of the scanning path or the machining path. Thus, the depth of the vapor capillary can be detected more efficiently, quickly and precisely.

Figure 3:
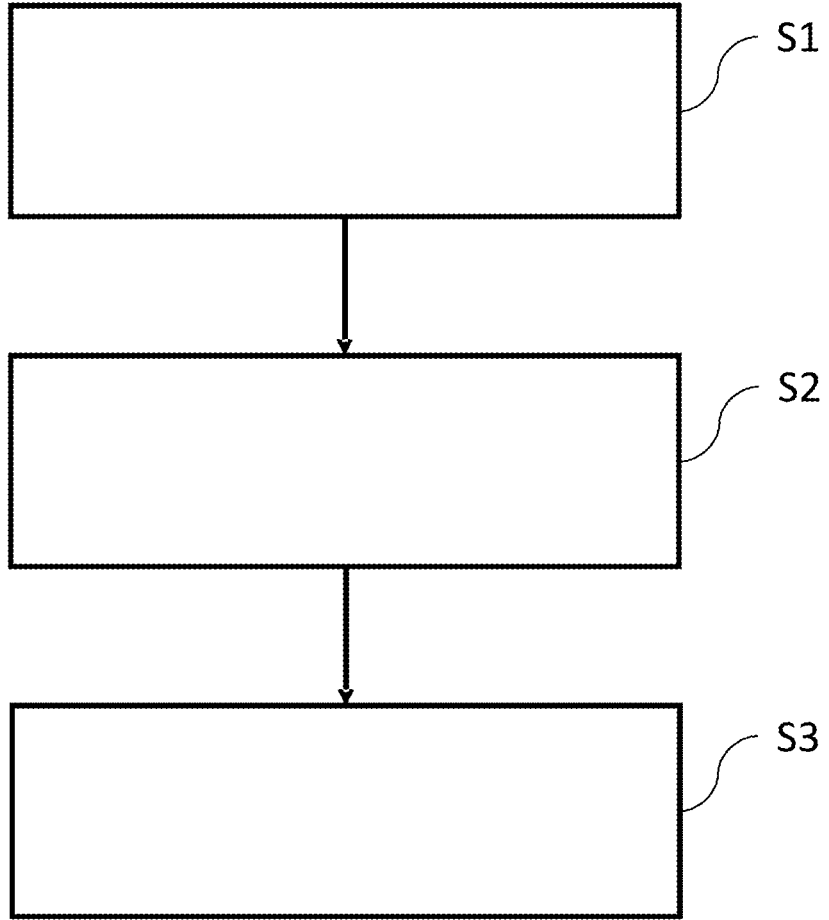
FIG. 3 shows a flow chart of a method for determining the depth of a vapor capillary during a laser machining process according to embodiments of the present disclosure.

FIG. 3 shows a flow chart of a method for determining a position and a depth of a vapor capillary during a laser machining process according to embodiments of the present disclosure. The method may be performed by the laser machining system 10 previously described with reference to FIGS. 1A and 1B.

FIGS. 4A-4D show schematic views of a surface of a workpiece to illustrate the determination and adjustment of the scanning area according to embodiments.

The method starts with performing the laser machining process, for example a laser welding process, by irradiating the machining laser beam 14 onto the workpieces 18*a*, 18*b* shown in FIGS. 1A, 1B to form the vapor capillary (S1). In this case, the machining laser beam 14 is deflected by the first deflection device 26 along a machining path 70 within the first scan field 64 of the first deflection device 26 on the workpiece 18*a* resting on top.

During the laser machining process, the optical measuring beam 36 is also irradiated onto the workpiece 18*a* in order to acquire measured distance values along the scanning path 82 based on the part of the optical measuring beam 36 reflected by the workpiece 18*a* (S2). The optical measuring beam 36 is deflected by the second deflection device 52 relative to the machining laser beam 14 along the scanning path within the scanning area on the workpiece 18*a*. The optical measurement beam 36 is also deflected together with the machining laser beam 14 by the first deflection device 26. At this point, the scanning area 76, in particular a size of the scanning area 76, is determined and adjusted within the second scan field 66 based on current parameters of the laser machining process. This can be performed, for example, based on information about the influence of the process parameters on the position of the vapor capillary relative to the position of the machining laser beam. This information may be stored as table values in the central control unit 60 or in the control unit 62. According to embodiments, the determination and adjustment of the scanning area may be carried out using an artificial neural network.

In the last step S3, the depth and/or the position of the vapor capillary are determined based on the acquired measured distance values.

In FIGS. 4A-4D, the first scanning area 64 of the first deflecting device 26 is shown on the workpiece 18*a*. Furthermore, the second scanning area 66 of the second deflection device 52 for deflecting the optical measuring beam 36 relative to and independently of the machining laser beam 14 is shown. The area or size of the second scanning area 66 is less than that of the first scanning area 64.

In addition, the position 68 of the machining laser beam 14 in the first scan field 64 is shown in FIGS. 4A-4D. The position 68 of the machining laser beam 14 may be defined as the center point, for example as the geometric center, of a spot on the workpiece surface created when the machining laser beam 14 is incident on the workpiece 18*a*. According to embodiments, the spot is circular, but the present disclosure is not restricted thereto.

The position 68 of the machining laser beam 14 may be defined as the position of the machining laser beam 14 on the surface of the workpiece 18*a*. The position 83 of the optical measuring beam 36 may be defined accordingly (see FIG. 5). The position of the scanning area 76 may be defined as a position of a center point or a geometrical center of the scanning area 76 on the workpiece surface.

Neglecting the chromatic aberration, the second scanning area 66 of the second deflection device 52 for the optical measuring beam 36 always includes the position 68 of the machining laser beam 14 and the position 68 of the machining laser beam 14 may correspond to a center point of the second scanning area 66. This is due to the fact that the optical measuring beam 36 is then superimposed on the machining laser beam 14 after the deflection by the second deflection device 52 and may be deflected together with the machining laser beam 14 by the first deflection device 26.

Also illustrated in FIGS. 4A-4D is a machining path 70 along which the machining laser beam 14 is guided during the laser welding process and the weld seam 72 formed in the wake. The machining velocity vector 74 is also shown. The machining velocity vector 74 may be represented as a two-dimensional vector parallel to the workpiece surface. The machining velocity vector 74 is a tangent to the machining path 70. The machining speed is the absolute value of the machining velocity vector 74.

Accordingly, the machining speed may be defined as a speed at which the machining laser beam 14 is irradiated and deflected along the machining path 70. A possibly superimposed wobbling movement of the machining laser beam 14 may be neglected. As a rule, an oscillating movement around the actual machining position is referred to as a wobbling movement, the amplitude of which roughly corresponds to the width of the resulting weld seam. When the machining laser beam 14 wobbles, the machining speed may refer to an average speed of the machining laser beam 14 along the machining path 70. However, preferably no oscillating wobbling movement is superimposed on the deflection of the machining laser beam 14 along the machining path 70.

Also shown in FIGS. 4A-4D are the actual position 78 of the vapor capillary and a theoretical or expected position 80 of the vapor capillary. According to embodiments, the theoretical position 80 may first be determined based on the aforementioned current process parameters. Alternatively or additionally, the theoretical expected offset between the position of the vapor capillary and the position 68 of the machining laser beam 14 may be determined. The scanning area 76 may then be determined based on the theoretical position 80 or the theoretical offset. For example, the scanning area 76 may be determined such that a center point of the scanning area 76 corresponds to the expected position 80.

Figure 4A:
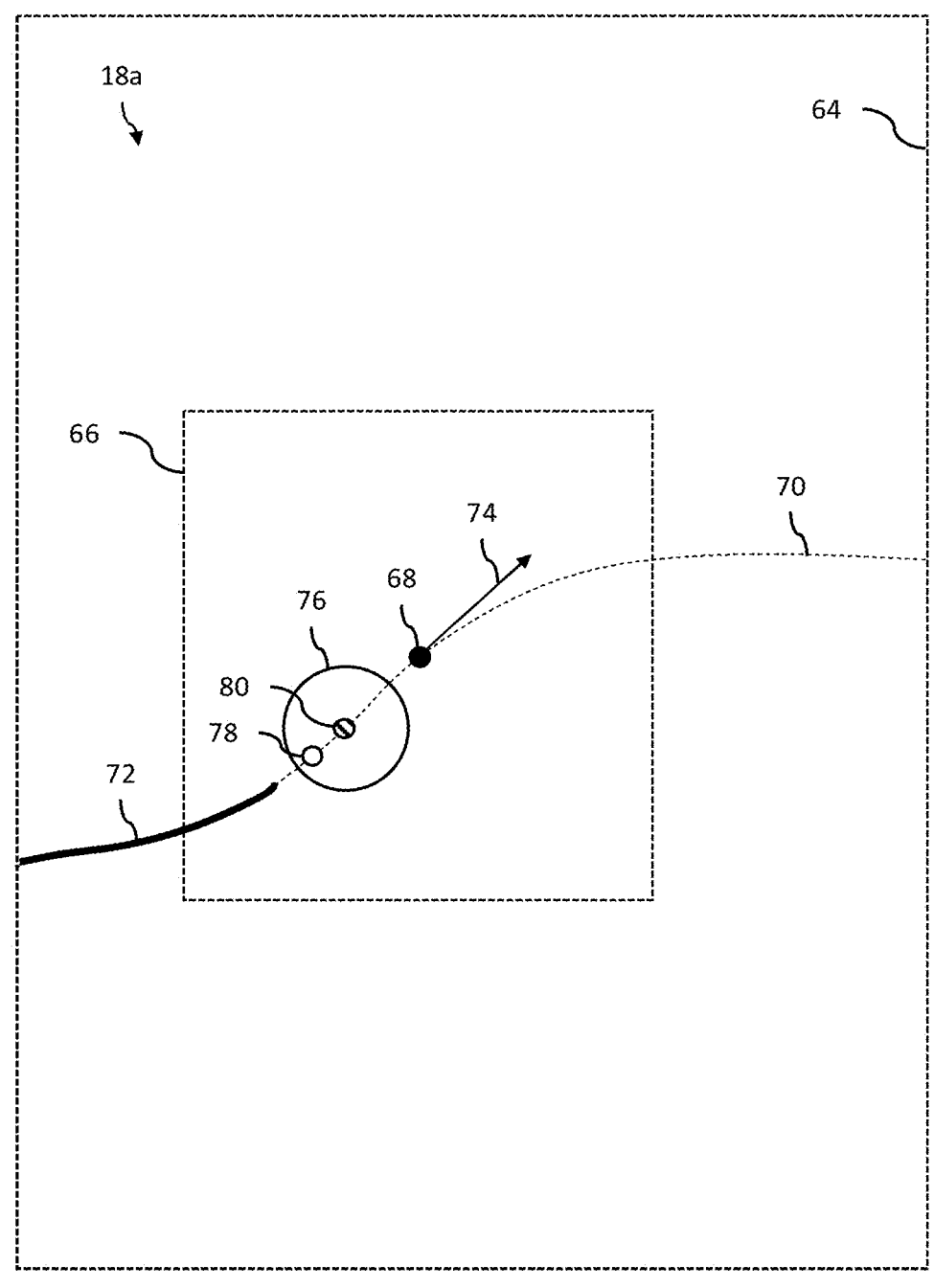
FIGS. 4A-4D show schematic views of a workpiece surface to illustrate the determination of the scanning area according to embodiments.

As shown in FIG. 4A, the scanning area 76 is set to be circular, for example. Furthermore, an area of the scanning area 76 is less than the area of the second scanning area 66 for the optical measuring beam 36. Thereby, the area in which the vapor capillary is searched for can be narrowed and the search can be accelerated compared to the case that the entire second scan area 66 is used for the search.

Figure 4B:
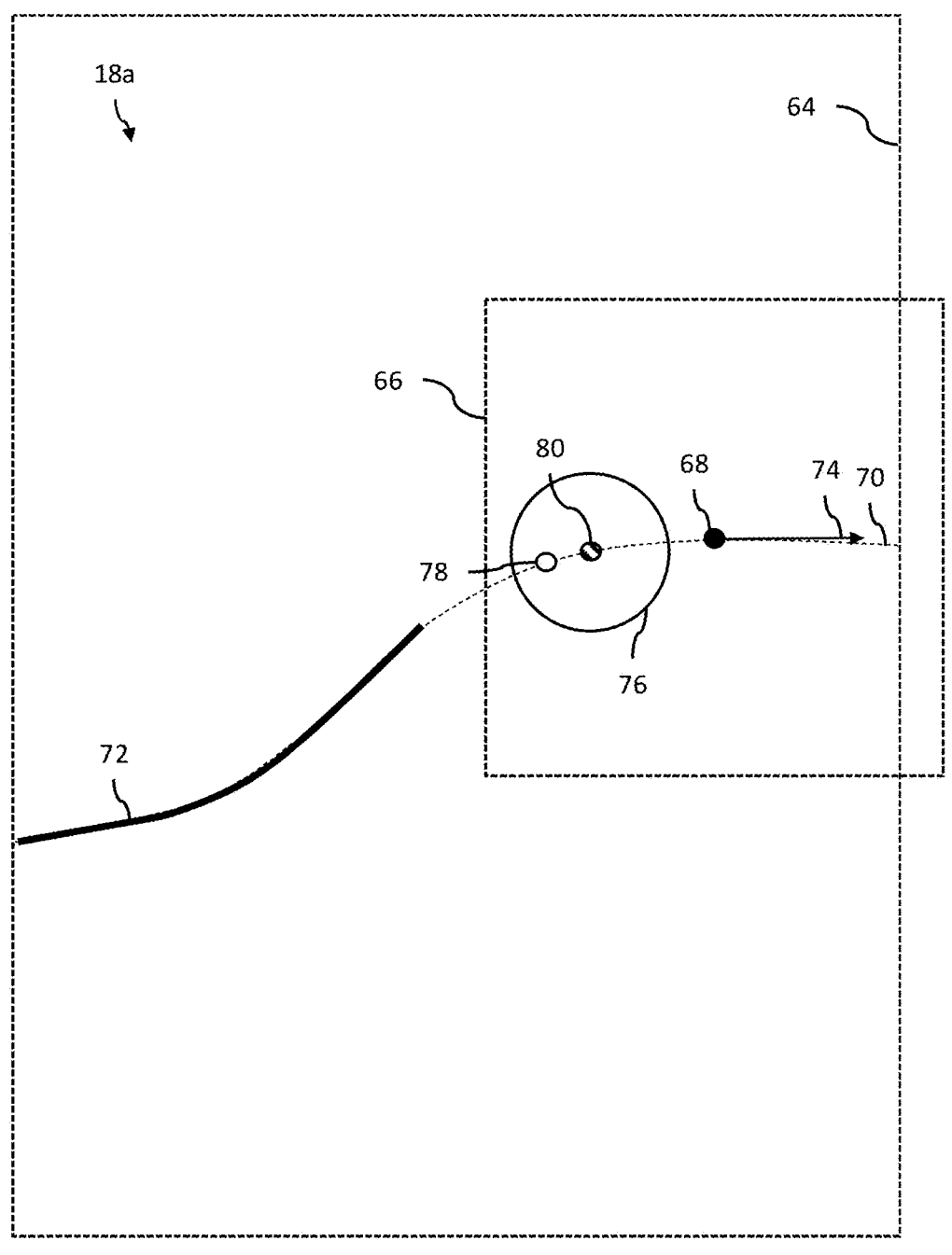

FIG. 4B shows a case in which the scanning area 76 is adjusted to the position 68 of the machining laser beam 14. Compared to FIG. 4A, the machining laser beam 14 has been further deflected along the machining path 70. The position 68 of the machining laser beam 14 and the machining direction 74 have thus changed. In particular, the position 68 of the machining laser beam 14 is closer to the right-hand edge of the first scanning area 64.

In comparison to FIG. 4A, the position of the scanning area 76 has been adjusted accordingly based on the changed position of the machining laser beam 14 and the changed machining direction 74. Furthermore, compared to FIG. 4A, the scanning area 76 has been enlarged. This has to do with the fact that optical errors and influences of the first deflection device 26 and the focusing optics 24 on the optical measuring beam 36, which are typically only optimized for the machining laser beam 14, increase at the edge of the first scanning area 64. To ensure that the actual position 78 of the vapor capillary is always within the scanning area 76, the size of the scanning area 76 may increase as the distance between the position 68 of the machining laser beam 14 and the edge of the first scan area 64 decreases. However, the size of the scanning area 76 is still less than the size of the second scanning area 66. According to embodiments, the size of the scanning area 76 may therefore increase with an increasing deflection of the machining laser beam 14 by the first deflection device 26, i.e. with an increasing deflection angle along the x- and/or y-axis.

Figure 4C:
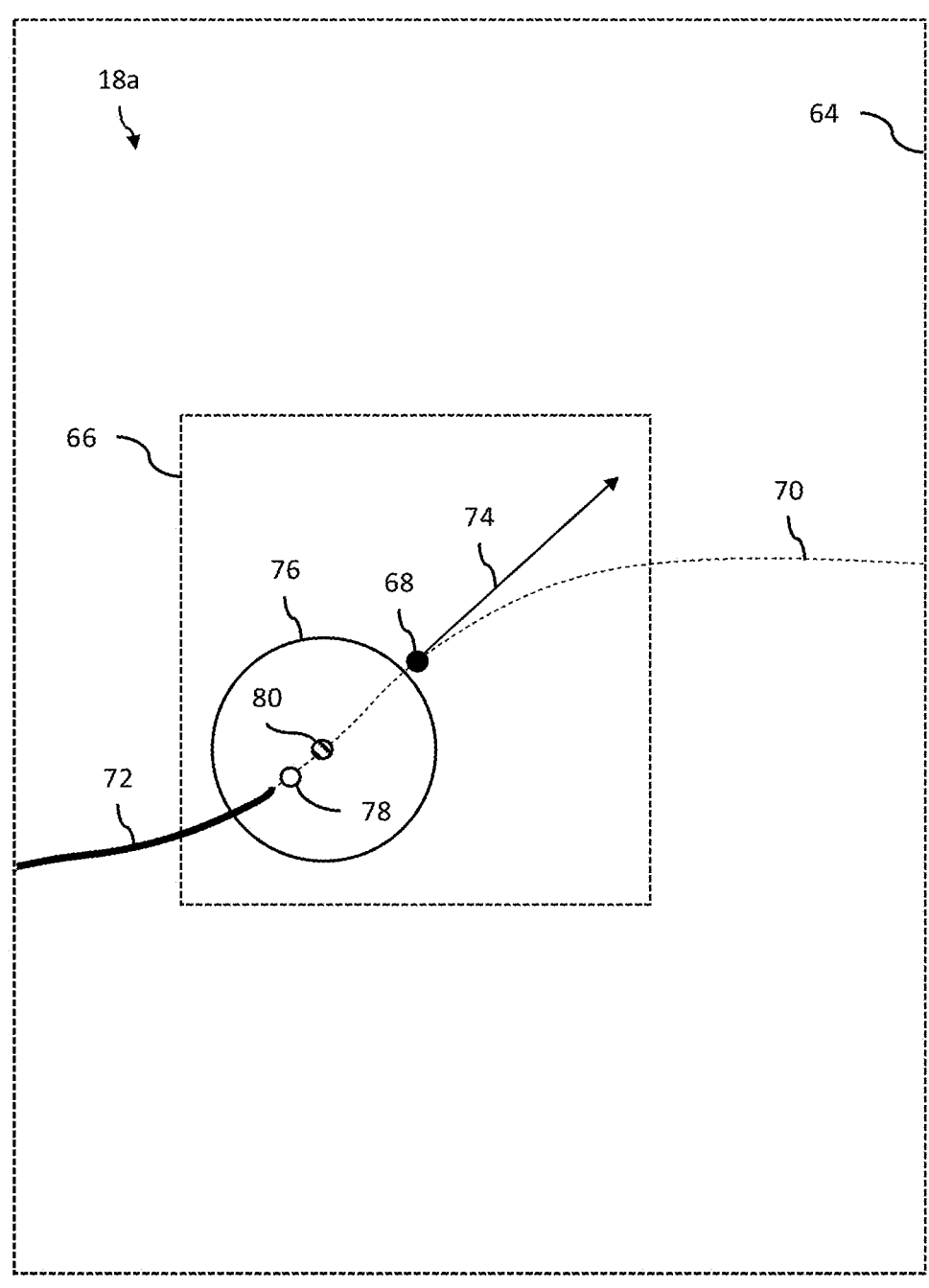

In FIG. 4C, the machining speed has been increased. In other words, the magnitude of the machining velocity vector 74 has been increased. As can be seen, the area of the scanning area 76 has been increased compared to the case of FIG. 4A. However, the scanning area 76 in FIG. 4C is less than the second scanning area 66. In addition, due to the higher machining speed, the distance between the position of the scanning area 76 and the position 68 of the machining laser beam 14 has been increased. This is based on the finding that the distance or offset between the theoretical position 80 of the vapor capillary and the position 68 of the machining laser beam 14 increases with increasing machining speed.

Figure 4D:
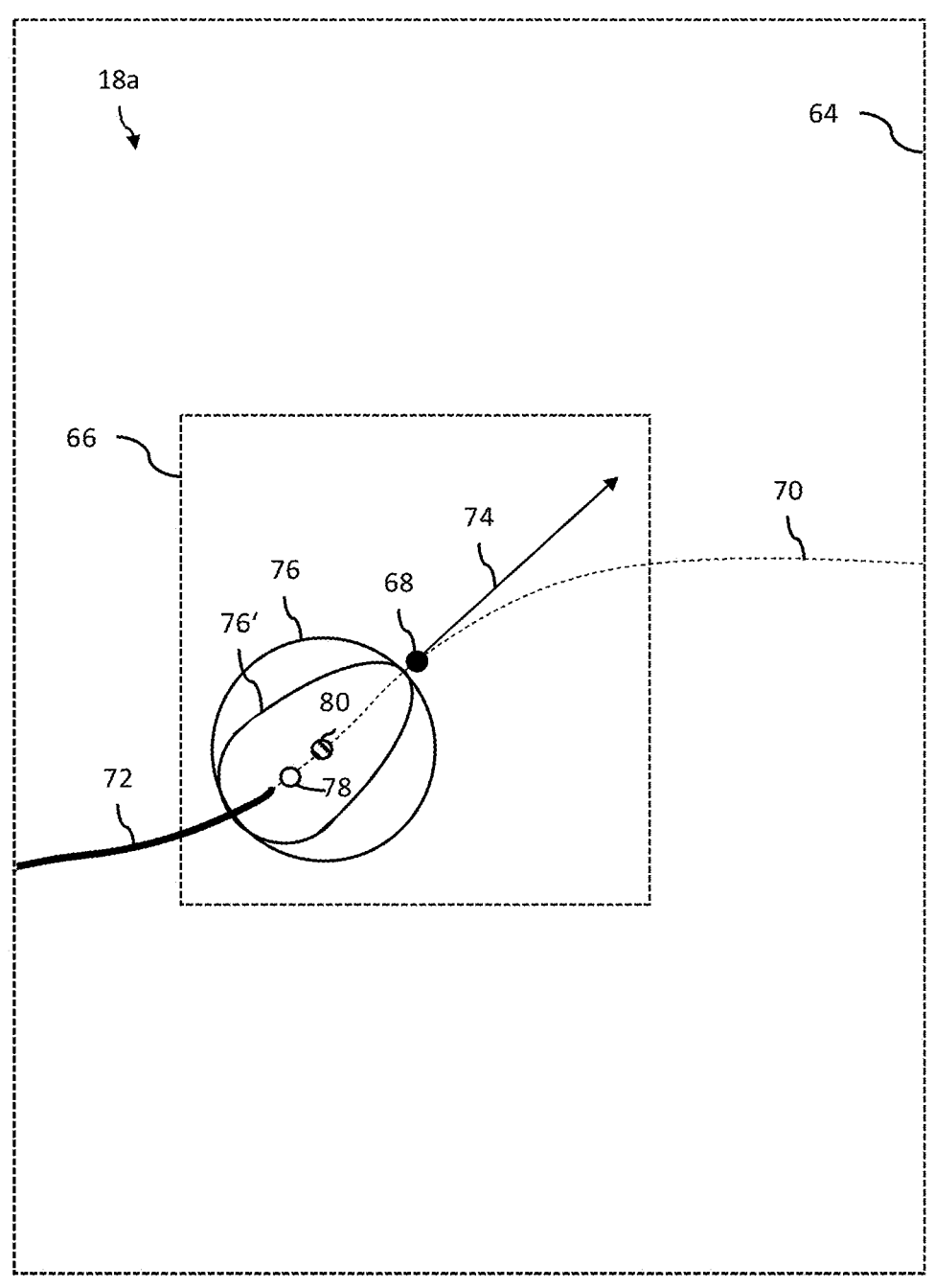

FIG. 4D shows a case in which the shape or geometry of the scanning area 76' has also been adjusted compared to FIG. 4C. In FIG. 4D, the scanning area 76' has a teardrop shape. According to other embodiments, the scanning area may have an oval shape, an egg shape, an elliptical shape, a trapezoidal shape, or a triangular shape. The scanning area 76 of FIG. 4C is additionally drawn in FIG. 4D. The scanning area 76' has substantially the same length as the scanning area 76. However, the width of the scanning area 76' is reduced compared to the scanning area 76. Accordingly, the area to be searched for acquiring the position and depth of the vapor capillary can be further optimized and reduced.

Figure 5:
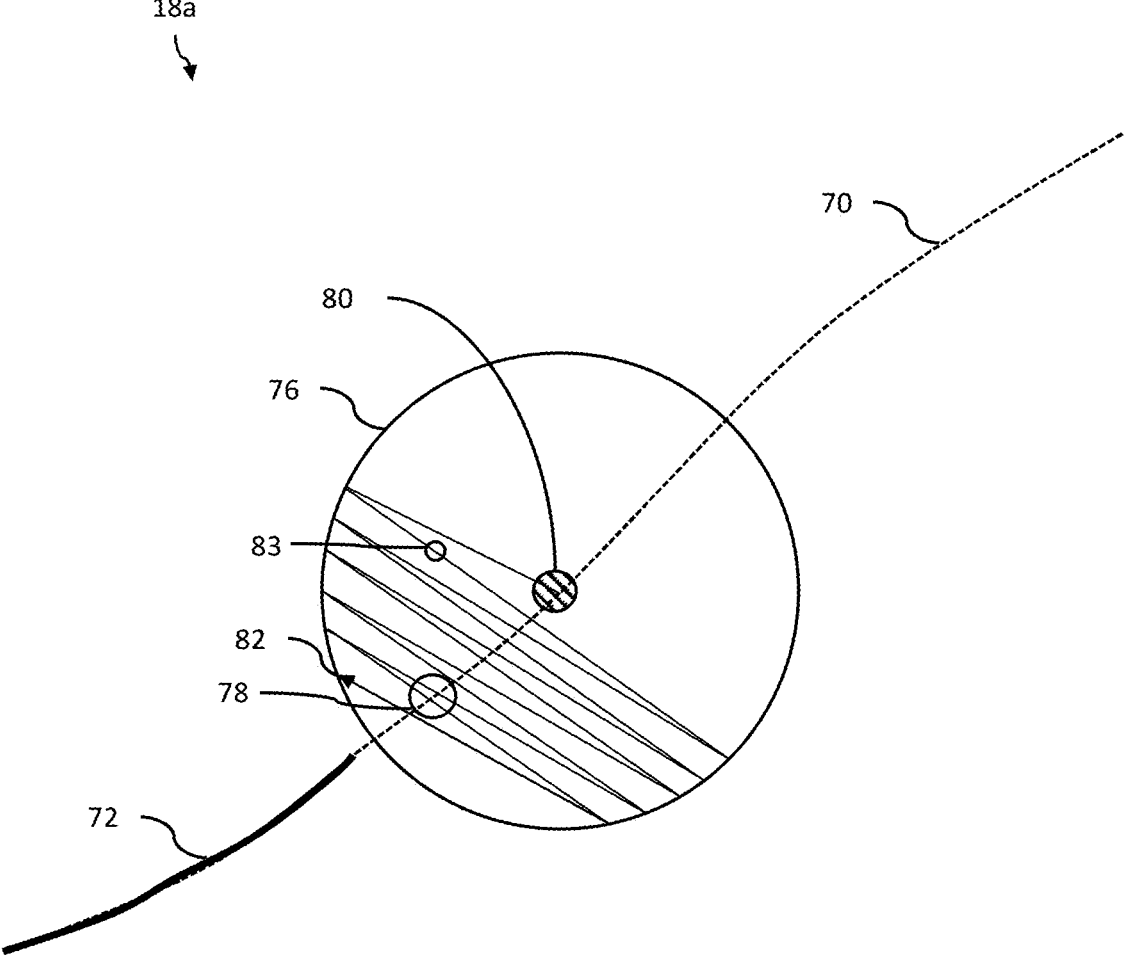
FIG. 5 shows a schematic view illustrating a scanning path within a scanning area according to embodiments.

FIG. 5 illustrates a scanning path 82 within the adjusted scanning area 76 of FIG. 4A. Starting from the theoretical position 80 of the vapor capillary, the surface of the workpiece 18a is scanned by deflecting the position 83 of the optical measuring beam 36 on the workpiece 18a, 18b along the zigzag scanning path 82 in order to obtain measured distance values for determining the position 78 of the vapor capillary and the depth of the vapor capillary. The scanning path thus begins, for example, at the theoretical position 80 of the vapor capillary. The scanning path may also spiral outward, preferably originating at the theoretical position 80 of the vapor capillary.

According to embodiments, the method for determining the position of the vapor capillary or the depth of the vapor capillary may be carried out repeatedly or iteratively during the laser machining process in order to reliably determine the position or depth of a moving vapor capillary. For example, the vapor capillary may follow in the wake of the machining laser beam along the machining path. For example, in a first step, the position of the vapor capillary is determined as described above. In a subsequent second step, the position of the vapor capillary determined in the first step is used as the center point for the scanning area for determining the position and/or depth of the vapor capillary in the second step. According to embodiments, the position of the scanning area thus follows the position of the machining laser beam along the machining path, with the scanning area being arranged in the wake of the machining laser beam.

According to embodiments, the scanning area may initially be enlarged after a batch change of the workpieces 18a, 18b. As a result, any change in thickness, material or other parameters of the workpieces 18a, 18b between the batches can be taken into account.

According to embodiments, when the optical measuring beam 36 is irradiated and deflected on the workpiece 18a by the second deflection device 52, i.e. when the optical measuring beam 36 is positioned on the workpiece 18a, 18b, the chromatic offset between the optical measuring beam 36 and the machining laser beam 14 is determined by the control unit 62 or taken into account and maintained by the central control unit 60. This may be carried out, for example, by determining said offset as a function of the wavelengths of the machining laser beam and the optical measuring beam and the position of the optical measuring beam 36 in the first scan field 64 by measurements or simulations and storing it in the control unit, for example as a table or functional relationship. When the optical measurement beam 36 is deflected along the scanning path 82, the offset can then be taken into account and corrected. The chromatic offset may also be referred to as chromatic aberration of the optical measurement beam 36 in relation to the machining laser beam 14 and represents a chromatic aberration of the optical measurement beam 36 by elements of the laser machining head 16 configured and designed for the machining laser beam 14. The chromatic aberration of the optical measurement beam 36 is due to the fact that a wavelength of the optical measurement beam 36 and a wavelength of the machining laser beam 14 differ. The chromatic aberration of the optical measuring beam 36 may be caused by the focusing optics 24, for example.

According to further embodiments, the focus of the optical measurement beam 36 is adjusted or corrected as function of its position in the first scan field 64. This can be performed, for example, by moving the collimator optics 50. In particular, this can be done by a so-called motorized collimation. The adjustment of the focus or the motorized collimation may also be controlled as a function of the process parameters. This procedure is also advantageous when using F-theta optics for the focusing optics 22 since such optics are generally only configured and optimized for the wavelength of the machining laser beam 14.

The laser machining system 10 preferably includes additional sensors, for example photodiodes, pyrometers and/or a camera. These may be used to determine or filter out, based on the measured distance values acquired by the measuring device 34, those values which indicate or represent a distance to the keyhole bottom or to the deepest point of the vapor capillary. Artificial intelligence methods may also be used for this purpose, for example neural networks trained with experimental data for this purpose.

According to embodiments, the laser machining system 10 also includes an interface for transmitting data, for example the specific position 78 and/or depth of the vapor capillary, to an external system.

The present disclosure includes a method and a laser machining system for laser beam welding with a scanner system, wherein the depth and position of the vapor capillary are determined during the laser beam welding process using OCT measurements. The scanner system includes a first scanner for deflecting the machining laser beam and the OCT measuring beam and a second scanner for deflecting the OCT measuring beam as well as a control unit for the second scanner which determines the scanning area of the OCT measuring beam as a function of various process parameters.

The invention claimed is:

1. A method for monitoring a laser machining process, comprising:

radiating a machining laser beam onto at least one workpiece to form a vapor capillary, said machining laser beam being deflected by a first deflection device along a machining path within a first scan field of said first deflection device on said workpiece;

radiating an optical measuring beam onto said workpiece, wherein said optical measuring beam is deflected by a second deflection device relative to said machining laser beam and then deflected together with said machining laser beam by said first deflecting device, said optical measuring beam being deflected by said second deflection device along a scanning path within a scanning area on said workpiece;

acquiring measured distance values along said scanning path based on a part of said optical measuring beam reflected by said workpiece;

determining a depth and/or a position of the vapor capillary based on the acquired measured distance values; and wherein an area and a position of said scanning area on said workpiece are adjusted based on a position of said machining laser beam in said first scan field.

2. The method according to claim 1, further comprising adjusting a shape of said scanning area based on the position of said machining laser beam in said first scan field; and/or wherein the position, area and/or shape of said scanning area is adjusted based on a machining speed along said machining path.

3. The method according to claim 1, further comprising determining a theoretical position of the vapor capillary and determining a position of said scanning area based on the determined theoretical position of the vapor capillary.

4. The method according to claim 1, wherein:

said machining laser beam is moved along said machining path solely by deflection using said first deflection device; and/or a laser machining head, through which said machining beam is irradiated onto the workpiece, remains stationary with respect to the workpiece during the laser machining process.

5. The method according to claim 1, wherein the area of said scanning area is determined to be larger the closer the position of said machining laser beam is to an edge of said first scan field and/or the higher a machining speed is.

6. The method according to claim 1, wherein a distance between the position of said scanning area and the position of said machining laser beam increases as a machining speed increases.

7. The method according to claim 2, wherein the position, the shape and/or the area of said scanning area is determined in such a way that the position of said machining laser beam is located outside said scanning area.

8. The method according to claim 1, wherein said second deflection device has a second scan field which is smaller than said first scan field.

9. The method according to claim 1, wherein:

the position of said machining laser beam is a current position of said machining laser beam during the laser machining process; and/or said scanning area is determined in real time.

10. The method according to claim 1, wherein said scanning area is determined based on at least one of:

a machining direction, a velocity vector of the machining laser beam, a power of said machining laser beam, a material and/or thickness of the at least one workpiece, a deflection angle of said first deflection device, an optical path length of said machining laser beam between a laser source for said machining laser beam and the at least one workpiece, an optical path length of said optical measuring beam between a radiation source of said optical measuring beam and the at least one workpiece, a focal position of said machining laser beam, a focal position of said optical measuring beam, a cross-sectional shape of said machining laser beam in focal position, a cross-sectional shape of said optical measuring beam in focal position, and an orientation of said laser machining system.

11. The method according to claim 1, wherein said scanning path within said scanning area has the shape of a figure 8, a horizontal figure 8, a dumbbell, a peanut, a spiral, a circle, an arc of a circle, a zigzag shape, and/or of a meandering shape.

12. The method according to claim 1, wherein said scanning area is determined based on table values and/or using an artificial neural network and/or based on a functional relationship.

13. The method according to claim 1, wherein the at least one workpiece comprises a battery cell and irradiating said machining laser beam is performed to contact the battery cell.

14. The method according to claim 1, wherein the laser machining process is a laser welding process.

15. A laser machining system, comprising:

a laser machining head for irradiating a machining laser beam onto at least one workpiece to form a vapor capillary, said laser machining head including a first deflection device for deflecting said machining laser beam along a machining path within a first scan field on said workpiece;

a measuring device for interferometric distance measurement which is configured to irradiate an optical measuring beam onto the at least one workpiece, and a second deflection device for deflecting the optical measuring beam relative to said machining laser beam along a scanning path within a scanning area on said workpiece;

a coupling device for coupling said optical measuring beam into said laser machining head, said coupling device being arranged in front of said first deflection device in the direction of propagation of said machining laser beam so that said optical measuring beam can be deflected by said first deflection device together with said machining laser beam;

wherein said measuring device is configured to acquire measured distance values along said scanning path based on a part of said optical measuring beam reflected by said workpiece for determining a depth and/or a position of the vapor capillary and to adjust an area and a position of said scanning area on said workpiece based on a position of said machining laser beam within said first scan field.

16. The laser machining system according to claim 15, wherein:

said first deflection device is configured to deflect said machining laser beam by a maximum first deflection angle along a first axis and to deflect said machining laser beam by a predetermined maximum second deflection angle along a second axis, the first and second axes being perpendicular to one another; and said first scan field is specified by the maximum first deflection angle and the maximum second deflection angle, the maximum first deflection angle and/or the maximum second deflection angle being equal to or greater than 10 degrees.

17. The laser machining system according to claim 15, wherein:

said measuring device comprises a collimation device for setting a focal position of said optical measuring beam; and said measuring device is configured to control said collimation device to set the focal position of said optical measuring beam based on the position of said optical measuring beam within said first scan field and/or within a second scan field.

18. The laser machining system according to claim 15, wherein said measuring device is or includes an optical coherence tomograph.

19. The laser machining system according to claim 15, wherein the laser machining system is a laser welding system.

*   *   *   *   *